(12) United States Patent
Brenner et al.

(10) Patent No.: US 6,488,315 B1
(45) Date of Patent: Dec. 3, 2002

(54) COUPLING FOR MICROCOMPONENTS

(75) Inventors: Günter Brenner, Griesheim; Michael Schmelz, Kriftel; Hanns Wurziger, Darmstadt; Norbert Schwesinger, Ilmenau, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/529,997

(22) PCT Filed: Oct. 12, 1998

(86) PCT No.: PCT/EP98/06464

§ 371 (c)(1),
(2), (4) Date: Apr. 27, 2000

(87) PCT Pub. No.: WO99/20906

PCT Pub. Date: Apr. 29, 1999

(30) Foreign Application Priority Data

Oct. 22, 1997 (DE) .......................................... 197 46 585

(51) Int. Cl.$^7$ ................................................ F17D 1/17
(52) U.S. Cl. .................... 285/124.5; 137/884; 137/597; 137/315.01; 285/404.91
(58) Field of Search ................................ 137/884, 597, 137/315.01; 285/124.1, 124.2, 124.3, 124.4, 124.5, 404.91

(56) References Cited

U.S. PATENT DOCUMENTS

| 3,779,584 A | * | 12/1973 | Ignatjev | 285/137 R |
| 4,507,707 A | * | 3/1985 | Willis | 361/380 |
| 4,951,709 A | * | 8/1990 | Kirkham | 137/561 |
| 5,640,995 A | * | 6/1997 | Packard et al. | 137/597 |
| 5,653,259 A | * | 8/1997 | Ramstad | 137/884 |
| 5,964,239 A | * | 10/1999 | Loux et al. | 137/15 |
| 6,209,928 B1 | * | 4/2001 | Benet et al. | 285/124.1 |

FOREIGN PATENT DOCUMENTS

| DE | 4 101 575 | 7/1992 |
| EP | 0 092 779 | 11/1983 |
| EP | 0 117 381 | 9/1984 |
| EP | 0 189 940 | 8/1986 |
| WO | 96 28664 | 9/1996 |

* cited by examiner

Primary Examiner—Lynne H. Browne
Assistant Examiner—Kenn Thompson
(74) Attorney, Agent, or Firm—Millen, White, Zelano & Branigan, P.C.

(57) ABSTRACT

A coupling for microcomponents has several essentially plane-parallel plates with line connections for delivering and discharging liquid or gaseous components. The line connections are mounted on a connection block which protrudes through openings in the plates with fixing segments that engage a pressure plate retained by a clip. The line connections open out in an area of line bores in the plate.

17 Claims, 1 Drawing Sheet

COUPLING FOR MICROCOMPONENTS

Figure 1:
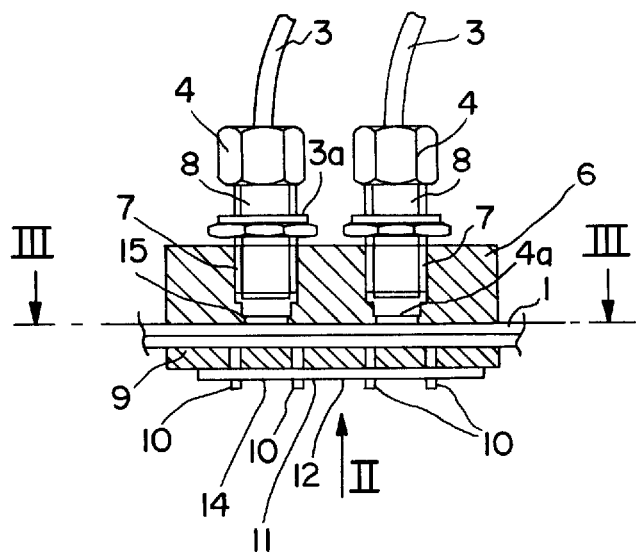

The invention relates to a coupling for microcomponents which microprocesses fluids, such as micromixers, micropumps, microvalves and the like, comprising a plurality of substantially plane-parallel plates, with line connections for the supply of fluid to the components to be conveyed or mixed and for the removal of the fluids.

Numerous chemical reactions require exact temperature control and intimate mixing of the components which are to be mixed. In addition, process controll is becoming increasingly important; the required elevated degree of reliability can be ensured more easily by using lower mass flow rates. Microcomponents of a wide variety of designs are able to fulfil these requirements.

The invention deals with a coupling element for microcomponents which have a plurality of plane-parallel plates which rest on top of one another and, in their surfaces which are resting on top of one another (at the interfaces thereof, contain the structures required for the necessary mixer geometry function. Due to their good thermal conductivity and ease of structuring, these plates usually consist of silicon (known as silicon wafers) and, in the interior, have a geometry adapted to the function of the microcomponent. However, the use of other, chemically resistant materials which are adapted to the conditions of use is also possible.

Owing to the limited mechanical strength of silicon, it is necessary as far as possible to avoid tensile and flexural loads on the plates. However, fitting the line connections for the supply of the components to be mixed or conveyed and for their removal presents difficulties. On the one hand, it is necessary to ensure accurate positioning with respect to the holes emerging at the plate surface; on the other hand, there is a risk that when the line connections are being fitted or when the microcomponent is being installed or dismantled unacceptable flexural loads will be introduced into the plates, in particular silicon plates, via these line connections.

Therefore, the object of the invention is to design a coupling for microcomponents of the generic type described in the introduction in such a way that the line connections can be fitted reliably to the plates while preventing unacceptable loads being imposed on the plates.

According to the invention, this object is achieved by the fact that the plates have congruent apertures, that a connection block, which is provided with the line connections, has a plurality of attachment webs which project through the apertures and a pressure plate and, on the rear side of the pressure plate, are connected to an attachment device, and that the connection block, in its bearing surface facing towards the plates, has line openings, opposite each of which there is a line hole in the top plate.

The arrangement of the line connections on the connection block prevents forces which would lead to impermissible loads being transmitted to the plates through these line connections. All the line connections are connected to the plates via the connection block and the opposite pressure plate in such a way that flexural loads are as far as possible avoided.

The accurate three-dimensional assignment to the attachment webs which is guaranteed by the arrangement of the line connections on the connection block also ensures accurate alignment with respect to the line openings in the plate. This accurate and reproducible positioning of the line connections is also ensured each time the microcomponent is dismantled and reassembled.

Preferably, the line holes lie in the plate surface between the apertures. This results in both a compact design and uniform support for the compressive forces which arise in the area of the line connections via the attachment webs which project through the apertures.

According to a preferred embodiment of the invention, each line opening of the connection block is surrounded by an elastic sealing ring. This ensures sealed connection of the line in question.

It is particularly advantageous if each line connection has a threaded hole leading to the line opening, and that the sealing ring lies between the surface of the plate and an end face of a screw line connection which has been screwed into the threaded hole.

When the screw line connection is being screwed in, the elastic sealing ring is pressed against the plate surface. This results in a sealed connection. In the process, only compressive forces, which do not constitute any risk, act on the plate surface. The inserted elastic sealing ring serves simultaneously as a sealing and spring element which allows controlled tightening of the screw line connection.

Figure 2:
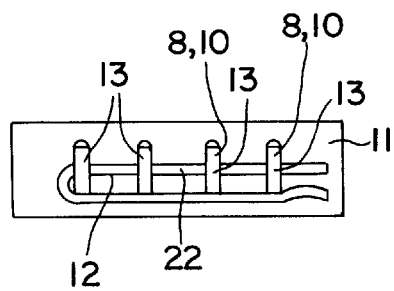
Figure 3:
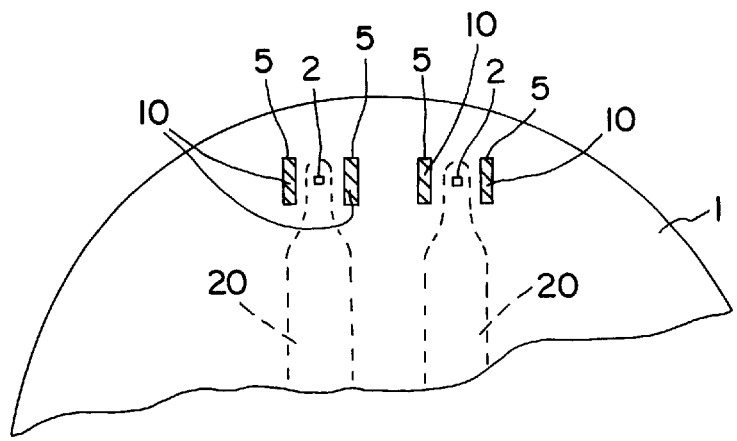

An exemplary embodiment of the invention which is illustrated in the drawing is described in more detail below. In the drawing:

FIG. 1 shows part of a microcomponent in section in the area of the line connections, FIG. 2 shows a view from below, in the direction of arrow II in FIG. 1, and FIG. 3 shows a section on line III—III in FIG. 1.

The microcomponent illustrated has a plurality of substantially plane-parallel plates 1 which rest on top of one another so as to abut one another. These plates are silicon wafers with an etched geometry shown by dotted lines 20, to form in the interior a geometry adapted to the function of a micromixer which may for example be a mixromixer, micropump or microvalve.

The line holes 2 connect an inlet line 3 and an outlet line 3 to the etched geometry for the supply and removal of liquid or gaseous components to and from the etched geometry.

Congruent apertures 5, between which the line holes 2 lie, are formed in the plates 1 resting on top of one another. The position of the line holes 2 is accurately defined with respect to the apertures 5.

A substantially cuboidal connection block 6 contains threaded holes 7, into each of which a commercially available microthread 8 of each line connection 4 is screwed.

Four attachment webs 10, which project through the apertures 5 and a pressure plate 11 arranged on the rear side of the plate 1, protrude out of the bearing surface 9, which faces the surface of the plate 5, of the connection block 6.

In the exemplary embodiment illustrated, a common attachment device or retainer which holds the components described in this position comprises a clamping clasp or clip 12 which has a leg 22 that is fitted through transverse holes 13 in all the attachment webs 10.

Between each end face 14 of the screwed-in screw line connection of the microthread 8 and the plate surface of the plate 1 there is an elastic sealing ring 15 or an O-ring. Consequently, when the microthreads 8 are being screwed into the connection block 6, a sealed connection to the line holes 2 is formed. The elastic sealing ring also serves at the same time as a spring element which allows controlled tightening of the connection.

What is claimed is:

1. A coupling for microcomponents, comprising: a plurality of abutting substantially plane-parallel plates (1) having etched surfaces defining microcomponents as a fluid microprocessor wherein, the plates (1) have congruent aperatures (5) extending therethrough, a connection block (6) abuts the plane-parallel plates (1) and is provided with line connections (4) for the supply and removal of fluid components to the fluid microprocessor, the connection block having a plurality of attachment webs (10) which project both through the congruent apertures (5) and through a pressure plate (11) on a rear side of the plane-parallel plates, the pressure plate being connected to an attachment device (12), the connection block (6) in a bearing surface (9) facing towards the plates (1) having line openings (4a), opposite each of which there is a line hole (2) in a top plate (1) abutted by the connection block (6), which line hole (2) is in communication with the fluid microprocessor.

2. A coupling for microcomponents according to claim 1, characterized in that the line holes (2) lie in the plate surface between the apertures (5).

3. A coupling for microcomponents according to claim 1, characterized in that each line opening (3a) of the connection block (6) is surrounded by an elastic sealing ring (15).

4. A coupling for microcomponents according to claim 3, characterized in that each line connection (4) has a threaded hole (7) leading to the line opening (4a), and in that the sealing ring (15) lies between the surface of the plate (1) and an end face (14) of a screw line connection which has been screwed into he threaded hole (7).

5. A coupling for microcomponents according to claim 4 wherein the plane-parallel plates are silicon plates.

6. A coupling for microcomponenets according to claim 5 wherein the fluid microprocessor is a micromixer for mixing the fluid components.

7. A coupling for microprocessors according to claim 5 wherein the fluid microprocessor is a micromixer, a micropump or a microvalve.

8. A coupling for microprocessor according to claim 5 wherein the attachment device (12) is a clip having a leg (21) which is received through transverse holes (13) in each of the webs (10) to retain the pressure plate (13) against the rear side of the plates (1).

9. A coupling for microcomponents according to claim 1 wherein the plane-parallel plates (1) are silicon plates.

10. A coupling for microcomponenets according to claim 9 wherein the fluid microprocessor (20) is a micromixer for mixing the fluid components.

11. A coupling for microprocessors according to claim 9 wherein the fluid microprocessor (20) is a micromixer, a micropump or a microvalve.

12. An arrangement for coupling microcomponents for processing fluids, comprising:
   at least two silicon plates in abutment with one another over an interface having an etched geometry defining the microcomponent; both of the silicon plates having aperatures therethrough, the aperatures being in alignment with one another and one of the plates having line holes therein in communication with the etched geometry;
   a connection block having a plurality of line openings therethrough for receiving fluid lines, the connector blocks having resilient cushioning in direct abutment with the silicon plate having the line holes therethrough with the line openings in the connector block being in alignment with the line holes in the silicon plate;
   web connectors extending through the aperatures in the silicon plates, the web connectors each having a coupling element thereon for cooperation with a retainer;
   a pressure plate having aperatures therethrough for receiving the webs which webs project beyond the pressure plate; the pressure plate baring directly against another-one of the silicon plates, and
   a retainer positively interlocking with each of the webs to hold the pressure plate against the another one of the silicon plates and against the bias of the resilient cushioning.

13. The arrangement of claim 12 wherein the resilient cushioning is in the form of o-rings positioned around each line hole through the connecting block.

14. The arrangement of claim 13 wherein the coupling elements on the webs are transverse holes therethrough and wherein the retainer includes a leg which extends through the holes.

15. The arrangement of claim 12 wherein the line holes in the silicon plates are disposed between the aperatures.

16. The arrangement of claim 12 wherein each line hole in the connection block is threaded and wherein the resilient cushioning comprises an o-ring around each of the line holes disposed adjacent to an end face of a screw line connection on a fluid line which has been screwed into the threaded hole.

17. The arrangement of claim 16 wherein the microcomponenets are micromixers, micropumps or microvalves for fluids.

* * * * *